Jan. 27, 1925.

C. E. LOWE 1,524,483

STOCK ROLLER

Filed Oct. 21, 1924

Clyde E. Lowe
Inventor by Smith & Freeman
Attorneys

Patented Jan. 27, 1925.

1,524,483

UNITED STATES PATENT OFFICE.

CLYDE E. LOWE, OF EAST CLEVELAND, OHIO.

STOCK ROLLER.

Application filed October 21, 1924. Serial No. 744,943.

*To all whom it may concern:*

Be it known that I, CLYDE E. LOWE, a citizen of the United States of America, and a resident of East Cleveland, in the county of Cuyahoga and State of Ohio, have invented certain new and useful Improvements in Stock Rollers, of which the following is a full, clear, and exact description.

This invention relates to stock rolls for rubber manufacture and has for its object the provision of a new, inexpensive, simple, and very strong device of this character. These stock rolls are long cylindrical bars on which sheet rubber, fabric, or composition, is wound for storage and transportation about the factory during the manufacture of tires, tubes and other rubber articles. The essential requirements of such a device are lightness, stiffness, and freedom from trouble; but owing to the peculiar conditions existing in most rubber plants and tire factories the use encountered is extremely severe so that special precautions are required in the manufacture of such a device and at the same time cheapness and simplicity are universally demanded. Accordingly the objects of this invention are the provision of a device of this character which can be made of standard materials, in the simplest possible manner, with the smallest possible number of parts, and which shall meet the rigid requirements of weight, cost, and longevity.

Figure 1:
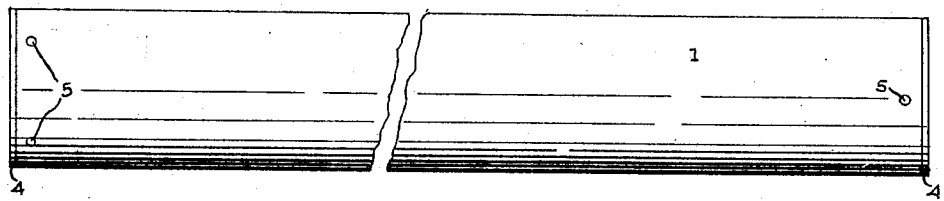
Figure 2:
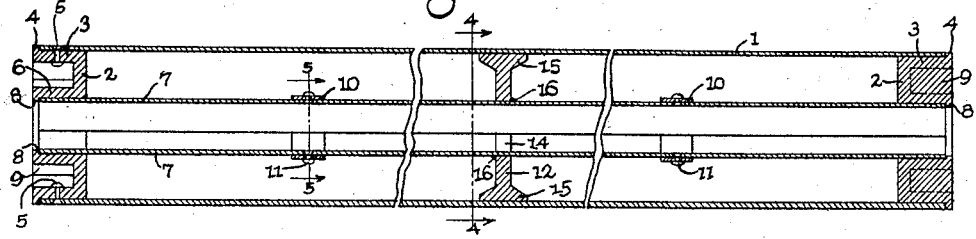
Figure 3:
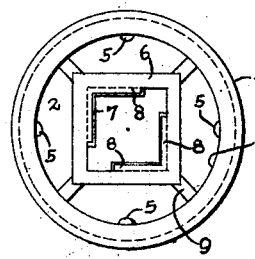
Figure 5:
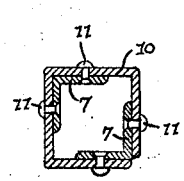
Figure 4:
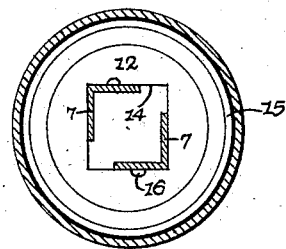
Figure 7:
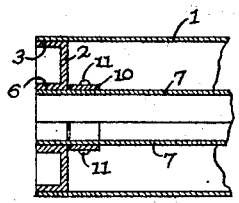
Figure 6:
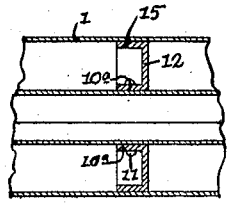

In the drawings accompanying and forming a part of this application I have shown one embodiment of my said invention, although it will be understood that I do not limit myself to details of manufacture except as specifically set forth. Fig. 1 is a side elevation and Fig 2 a longitudinal sectional view of one of my improved stock rolls; Fig. 3 is an end elevation of the same; Figs. 4 and 5 are cross sectional views corresponding respectively to the lines 4—4 and 5—5 of Fig. 2; and Figs. 6 and 7 are detail sectional views of modifications.

The body of the roll consists of a cylindrical tube 1 preferably of steel, either seamless or with welded longitudinal seam. Into each end of the tube I introduce a hub member comprising essentially a circular disk 2 having at its outer edge a cylindrical flange 3 which fits tightly into the tube and is preferably formed with an outturned lip 4 abutting against the end of the same for the double purpose of limiting the insertion of the hub and protecting the end of the tube which is ordinarily only about $\frac{1}{16}$ of an inch in thickness. The disk 2 is preferably located at the inner end of the flange 3, or at least at a sufficient distance therein to enable ready insertion and upsetting of the rivets 5 by which the parts are held together. The center of the disk 2 is formed with a longitudinal flange 6, square in outline, diagonally opposite corners of which receive angle iron strips 7—7 which extend from end to end of the roll. The interior of the flange 6 is formed adjacent opposite corners with inwardly projecting lips 8—8 which overlap the ends of the angle iron enough to hold the same tightly against longitudinal movement, but preferably having a width less than the thickness of the angle iron as shown in Figs. 2 and 3 so that when the roll is applied to a square arbor as in use, the only engagement is between the arbor and the angle iron, which being of superior strength is not injured by the severe handling it receives.

In addition the flange 6 may also be braced to the flange 3 by means of suitable radial spokes 9 if desired.

The diameter of the arbor is generally greater than the width of the angle iron strips so in order to hold the angle members apart and in close contact with their respective corners of the hubs I provide them at spaced points with rectangular collars 10—10 tightly secured thereto in some suitable manner as by the rivets 11, although other well known expedients such as welding can equally be employed. In the case of a long roll it is also desirable to employ bracing means inside the same, these means preferably comprising circular disks 12 of suitable material such as cast iron formed with square apertures 14 adapted to embrace snugly the angle strips 7—7 and preferably formed at their outer edges with rims 15 of increased breadth. In order to hold these in proper relation relative to the other members, the preferred expedient is to form in each of the angle members at each side of the disk 12 a small chip or fin 16 by means of a cold-chisel.

The main advantages of my construction are its cheapness and lightness combined with the strength and availability of the parts. The main strain on such devices occurs upon the square internal tube which is sometimes placed under load before it is sufficiently located upon the mandrel, but the angle iron members employed are among the strongest of structural shapes and are moreover readily obtainable and easily assembled in the manner indicated. Furthermore the spacing apart of the lips of these angle members produces a slotted tube which cannot become embedded or clogged with rubber fabric and other foreign matter.

In Fig. 2 I have shown the collars 10 as independent of the disks 12. In Fig. 6 I have shown the corresponding collars 10ª as integral with the disks 12. The former construction is generally cheaper but the latter is just as good. In Fig. 2 I have shown the collars 10 as spaced from the end hubs, the latter being provided with lips 8 to hold the parts against relative longitudinal movement. In Fig. 7 I have shown the collars 10 as abutting against the hubs and dispensing with the need of the lips. In most respects these arrangements are equally good although the former is rather the cheaper and it is well in all cases to surround the strips with an embracing member a short distance inside the end hubs to support the prying strain sometimes produced when the arbor has been inserted only part way into its seat. However, the close fitting disks 12 help accomplish this. Also a comparison of Figs. 6 and 7 shows that the end hubs and intermediate braces can be made identical.

It will therefore be understood that many changes can be made without departing from the scope of my inventive idea, that I propose to claim and secure all arrangements and presentation of the elements above described, and that I do not limit myself except as recited in my claims.

Having thus described my invention what I claim is:

1. A stock roll for the purpose decribed, comprising, in combination, a cylindrical metal tube, hubs tightly secured in the ends of said tube, said hubs having square openings therein, and angle iron strips secured in diagonally opposite corners thereof and together defining a space for the reception of a square arbor, the width of the arbor being greater than the width of the angle iron strips and the edges of said strips being spaced apart constituting slots which extend from end to end of the roll.

2. A stock roll for the purpose described, comprising, in combination, a cylindrical metal tube, hubs tightly secured in the ends of said tube, said hubs having square openings therein, angle strips located in diagonally opposite corners thereof and together defining a space for the reception of a square arbor, and rectangular stiffening rings embracing said angle iron strips at spaced points and rigidly secured thereto.

3. A stock roll for the purpose described, comprising, in combination, a cylindrical metal tube, a plurality of circular metal disks located inside said tube at spaced points, each disk having a square hole therein, angle iron strips located in opposite corners of said holes and extending between the terminal disks, said strips having their edges spaced apart and defining a square arbor seat, means separate from said disks encircling and secured to said strips and holding them apart, and interengaging provisions between said disks and strips whereby relative longitudinal movement is prevented.

4. A stock roll for the purpose described, comprising, in combination, a cylindrical metal tube, a pair of circular metal disks tightly secured in the ends of said tube, each disk having a square hole therein, a pair of angle iron strips located in opposite corners of said holes and extending from one disk to the other, means embracing said strips between said disks and tightly secured thereto, means preventing relative longitudinal movement between said strips and disks, and means bracing intermediate points of said tube from intermediate portions of said strips.

In testimony whereof, I hereunto affix my signature.

CLYDE E. LOWE.